April 3, 1934.  P. F. ZIEGLER  1,953,901
METHOD OF MAKING ADHESIVE TAPE
Filed Oct. 25, 1930
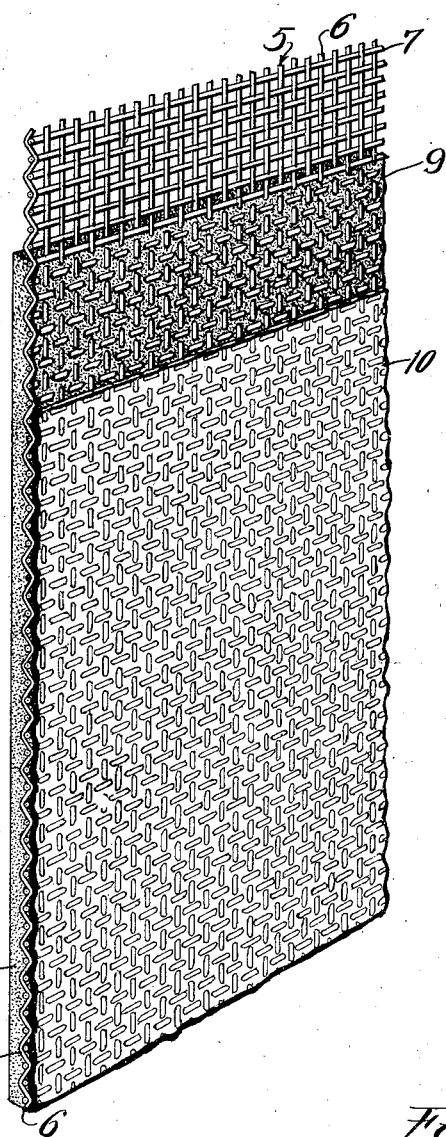
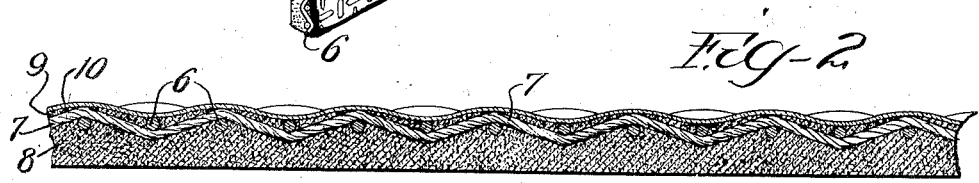
Inventor.
Paul F. Ziegler
By: Carl A. Lloyd
Atty.

Patented Apr. 3, 1934

1,953,901

UNITED STATES PATENT OFFICE 1,953,901

METHOD OF MAKING ADHESIVE TAPE

Paul F. Ziegler, Evanston, Ill., assignor to The Kendall Company, Boston, Mass., a corporation of Massachusetts Application October 25, 1930, Serial No. 491,186

3 Claims. (Cl. 91—68)

This invention relates to a method of making adhesive tape, which permits of its production at a cost much less than that of the present forms of adhesive tape.

A very substantial portion of the cost of the ordinary cloth backed adhesive tape is represented by the cost of the cloth which serves as the body of the tape and holds the sticky adhesive mass. According to my invention, instead of using cloth backing for the tape, I use a strip of gauze which I impregnate with the adhesive mass. After the gauze is impregnated with the adhesive, it is treated on one side with a glazing and strengthening agent to provide a non-adhesive surface. The gauze is obtainable at but a fraction of the cost of the cloth, and, when treated as presently to be described, gives a tape of excellent quality.

The invention is illustrated in the accompanying drawing in which:

Fig. 1 is a perspective view of a strip of tape made according to the invention; and Fig. 2 is a cross section through the strip of tape.

The base of the tape consists of a strip of gauze 5, comprising the longitudinally extending warp threads 6 and the transversely extending weft threads 7, the mesh of which depends upon the class of use for which the tape is intended. The ordinary limits for the mesh usually will fall between a 20/12 and 44/40 weave. Usually a coarsely woven gauze is preferred inasmuch as the cost is roughly proportional to the fineness of the weave. The body of the tape consists of an adhesive mass which is applied to the gauze base 5 to form an imperforate sheet. The adhesive mass is preferably applied to the gauze by a suitable calendering operation, the gauze being run between the rolls of the calendering machine which apply the adhesive to the gauze in the form of a uniform coating. The adhesive, as thus applied, provides an adhesive coating 8 on the side of the tape to which the adhesive is applied by the rolls of the calendering machine. The adhesive penetrates through the gauze to provide a layer 9 which barely covers the threads 6 and 7. If the gauze is of fairly fine weave the penetration of the adhesive will usually not be complete enough to wholly embed the threads. The form shown in the drawing represents a gauze of medium coarse weave and the strands 6 and 7 are just barely covered by the layer of adhesive 9.

The side of the tape opposite the adhesive layer 8 is then treated with a glazing and strengthening agent to provide a non-adhesive surface. The adhesive mass usually consists of a rubber base, in which are incorporated softeners such as rosin, wax and the like. When an adhesive material of this nature is employed, the glazed surface may be obtained by treating it with a solution of nitrocellulose. The nitrocellulose is preferably applied by spraying, although it may be applied by spreading or by running the tape over a roll which is arranged to coat one side of the tape with a solution of the nitrocellulose. When dried, the nitrocellulose forms on the layer 9 a non-adhesive layer 10 which materially strengthens the tape. It will be understood that the side of the tape to which the non-adhesive coating is not applied remains sticky by reason of the use of non-drying adhesive of the type ordinarily used on tapes of this general character. Adhesives of this type are described as pressure-sensitive in that they are normally sticky and can be made to adhere to the surface to which they are applied by pressure alone, without requiring preliminary wetting or heating, as in the patent to Drew, 1,760,820 of May 27, 1930. The glazed coating 10 conforms to the general contour of the adjacent face of the gauze. As previously stated, in the form shown in the drawing the gauze 5 is of medium coarse weave and the adhesive has penetrated sufficiently to just about cover the gauze strands. If the gauze is of such fineness that the ordinary calendering operation will not completely embed the threads in the body of the adhesive, there will be some exposure of the threads 6 and 7 through the layer 9. In either case, however, the whole surface opposite the adhesive layer 8 is rendered non-adhesive by the application of the glazing agent to form the layer 10. Other glazing and strengthening agents may be used instead of nitrocellulose. For example, vulcanized latex may be applied to the sticky surface 9 to render it non-adhesive.

In preparing the regular cloth backed adhesive tape, it is necessary to singe the back of the strip with a flame to remove fuzz which otherwise would stick to the layer of adhesive when the tape is wound upon itself. This operation is rendered unnecessary in making a tape according to my invention since the application of the glazed coating 10 effectively covers any fuzz on the gauze.

A tape constructed in the manner described may be used to good advantage as a substitute for the ordinary type of cloth backed adhesive tape. The layer of gauze reinforcement gives it ample strength and makes for a much cheaper article. The tape may be used for ordinary medical purposes and also in the arts, such as in the automobile painting industry, to mask portions of the body while a coating of paint is being applied to adjacent portions.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. The method of making adhesive tape which comprises pressing a mass of non-drying adhesive through one side of an open mesh fabric and thereafter applying to the opposite side of the fabric and adhesive protruding therethrough, a solution adapted when dried to provide a non-adhesive surface, leaving the opposite side with a pressure sensitive adhesive surface.

2. The method of making adhesive tape which comprises pressing a mass of non-drying adhesive through one side of an open mesh fabric and thereafter treating the opposite side of the fabric and adhesive protruding therethrough with vulcanized latex to provide a non-adhesive strengthening surface leaving the opposite side with a pressure sensitive adhesive surface.

3. The method of making adhesive tape which comprises pressing a mass of non-drying adhesive through one side of an open mesh fabric and thereafter treating the opposite side of the fabric and adhesive protruding therethrough with nitrocellulose to provide a non-adhesive, strengthening surface leaving the opposite side with a pressure sensitive adhesive surface.

PAUL F. ZIEGLER.